United States Patent [19]
Leblond

[11] 3,718,520
[45] Feb. 27, 1973

[54] TIRE BUILDING DRUM

[75] Inventor: Jean Leblond, Compiegne, France

[73] Assignee: Uniroyal Englebert France S.A., Neuilly sur Seine, France

[22] Filed: June 30, 1970

[21] Appl. No.: 51,227

[30] Foreign Application Priority Data

July 1, 1969 France..................................6922235

[52] U.S. Cl...................156/400, 156/415, 156/416, 156/417
[51] Int. Cl.................................................B29h 17/26
[58] Field of Search......156/132, 135, 398, 400, 401, 156/402, 414–420

[56] References Cited

UNITED STATES PATENTS 3,184,361  5/1965  Allitt....................................156/398
3,489,634  1/1970  Pizzo et al. ...........................156/398

*Primary Examiner*—Stephen C. Bentley
*Attorney*—Norbert P. Holler

[57] ABSTRACT

A radially expansible and axially contractable single-stage tire building drum, especially suited for building tire carcasses of high stiffness ply material having metallic wire cords or cables incorporated therein, is disclosed. The drum has two axially spaced, radially split cylindrical drum end sections arranged for opposed joint axial movements and each composed of rigid, circumferentially aligned, cylindrical sector-shaped elements, and an elastically radially expansible tubular diaphragm surrounding the space between the drum members and circumferentially secured to the latter at its ends. In the radially smallest and axially largest condition of the drum, the two drum end sections and the diaphragm, the latter at that time being internally rigidly supported by an internal lever system linking the drum end sections to one another, define a minimum diameter continuous cylindrical surface for receiving the carcass ply material and enabling the bead cores to be loosely slipped thereonto. Mechanical camming means including screw-actuated rollers operatively engaging the sector-shaped elements are provided for forcing the same radially outwardly under high unyielding forces to cause the carcass ply material to be tightly clamped against the surrounding bead cores, which minimizes the possibility of slippage of the ply material relative to the bead cores during the ply turn-up operation and during the subsequent shaping operation as the carcass is inflated and expanded radially outwardly while the drum end sections are displaced axially inwardly of the drum.

This abstract is not to be taken either as a complete exposition or as a limitation of the present invention, however, the full nature and extent of the invention being discernible only by reference to and from the entire disclosure.

15 Claims, 13 Drawing Figures

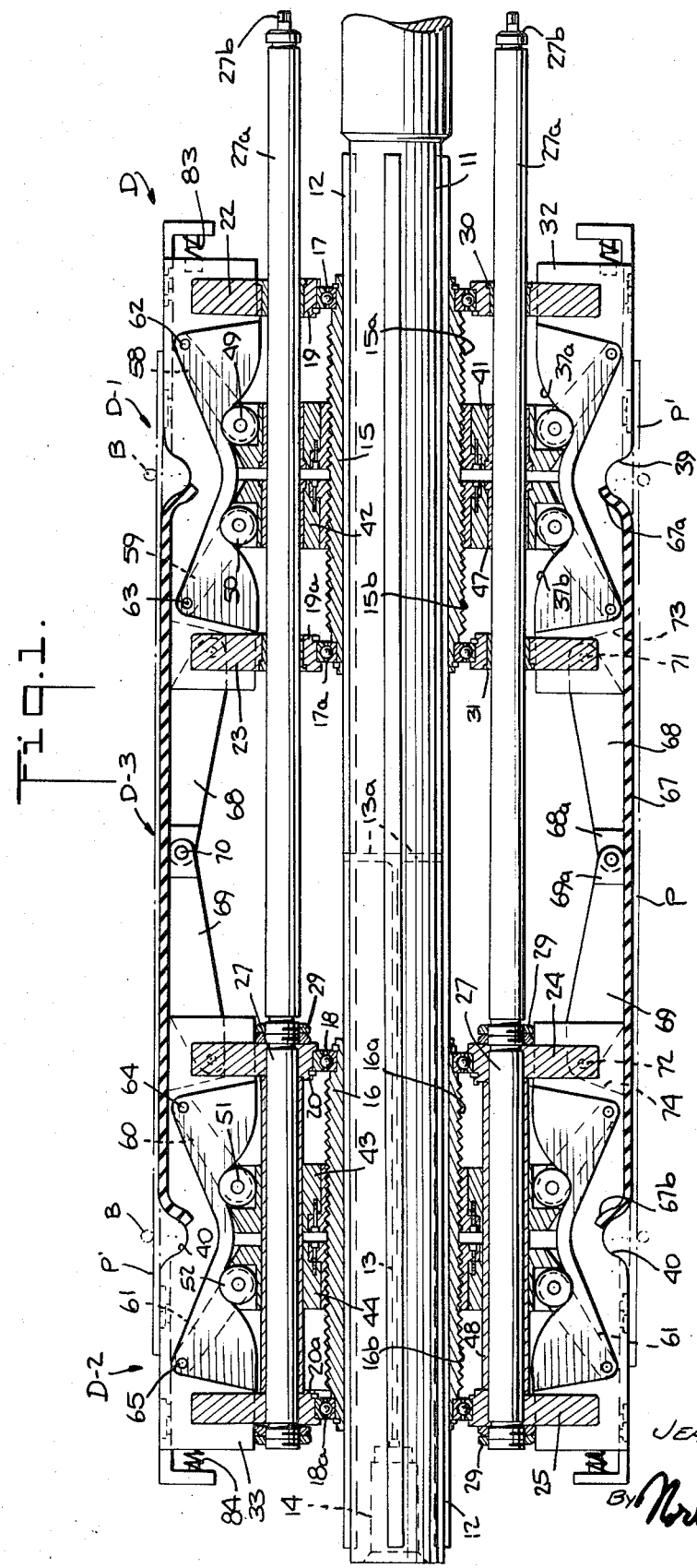

INVENTOR.
JEAN LEBLOND
BY Norbert P. Holler
ATTORNEY

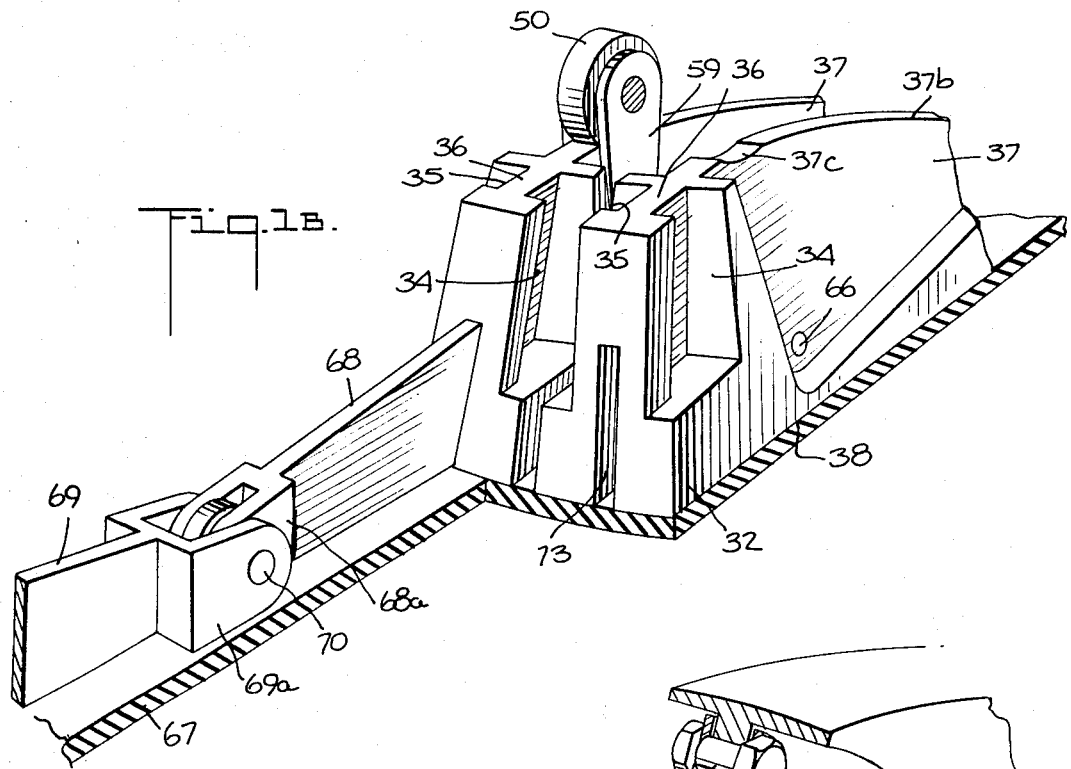
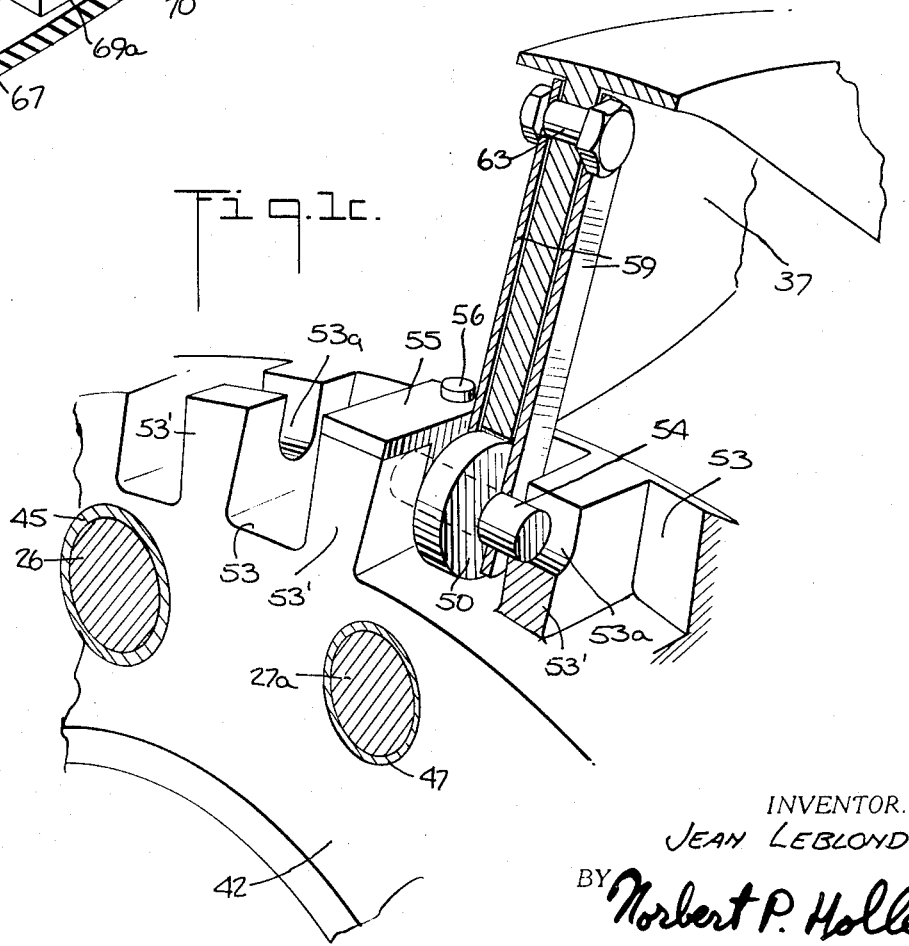

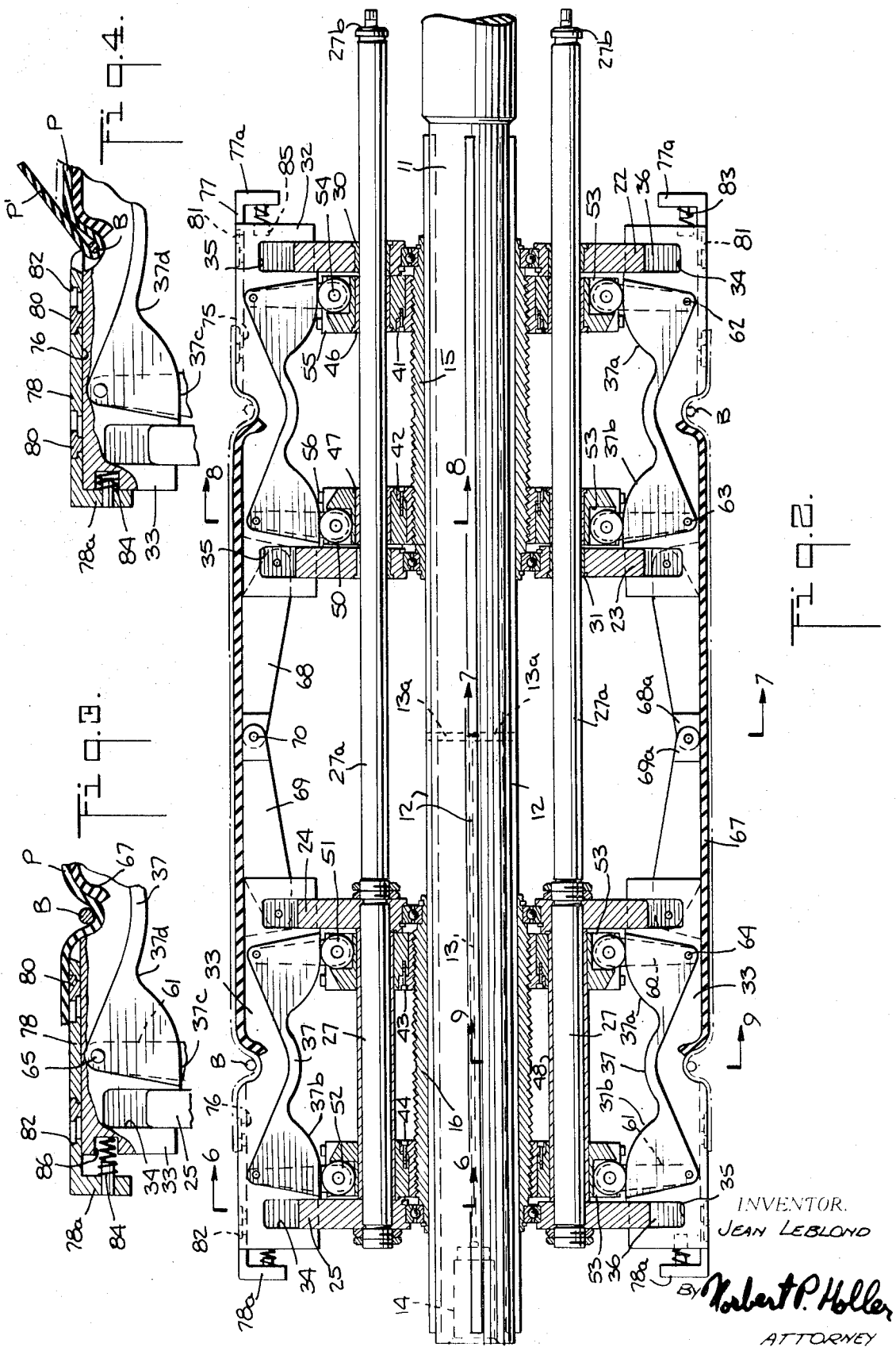

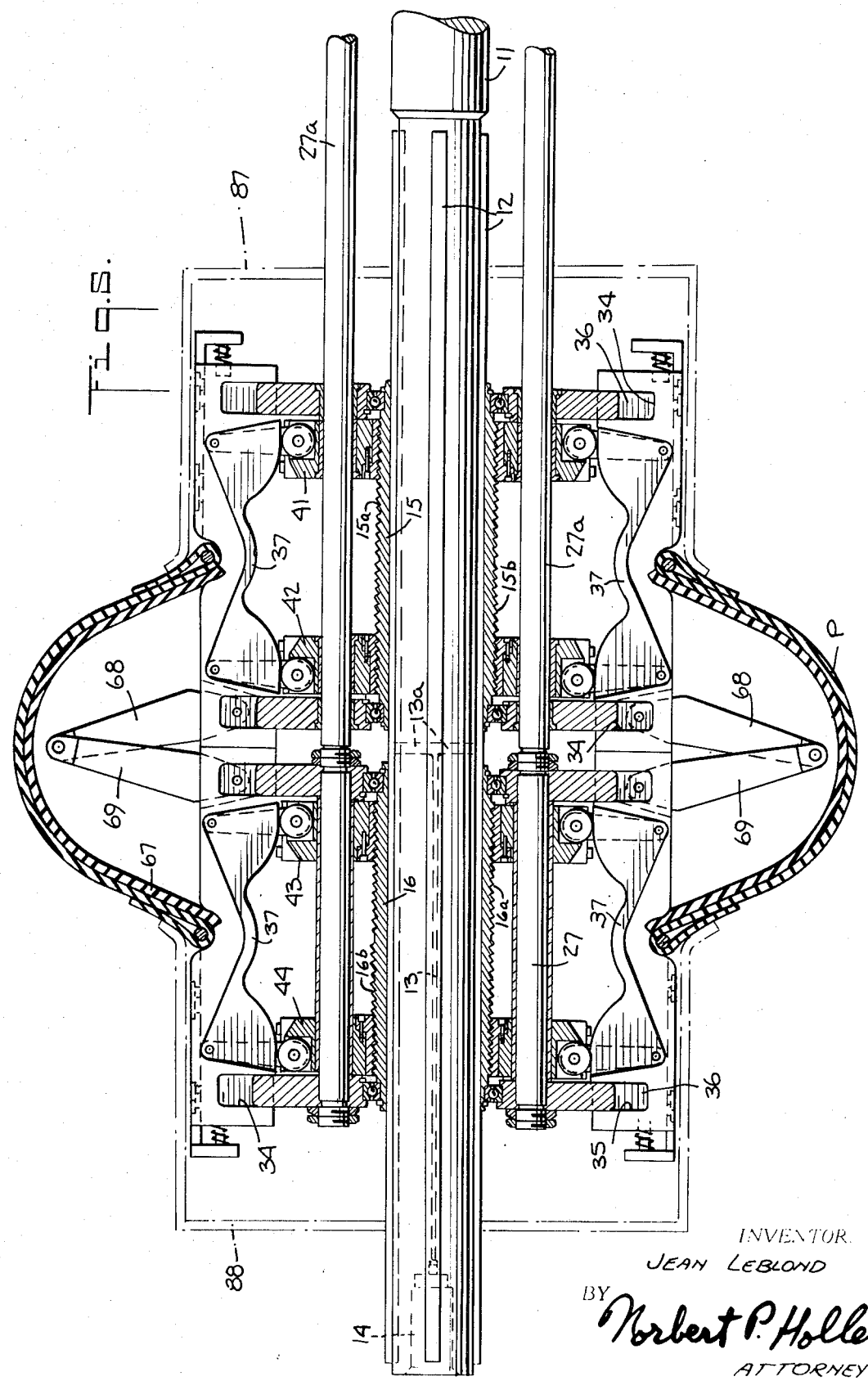

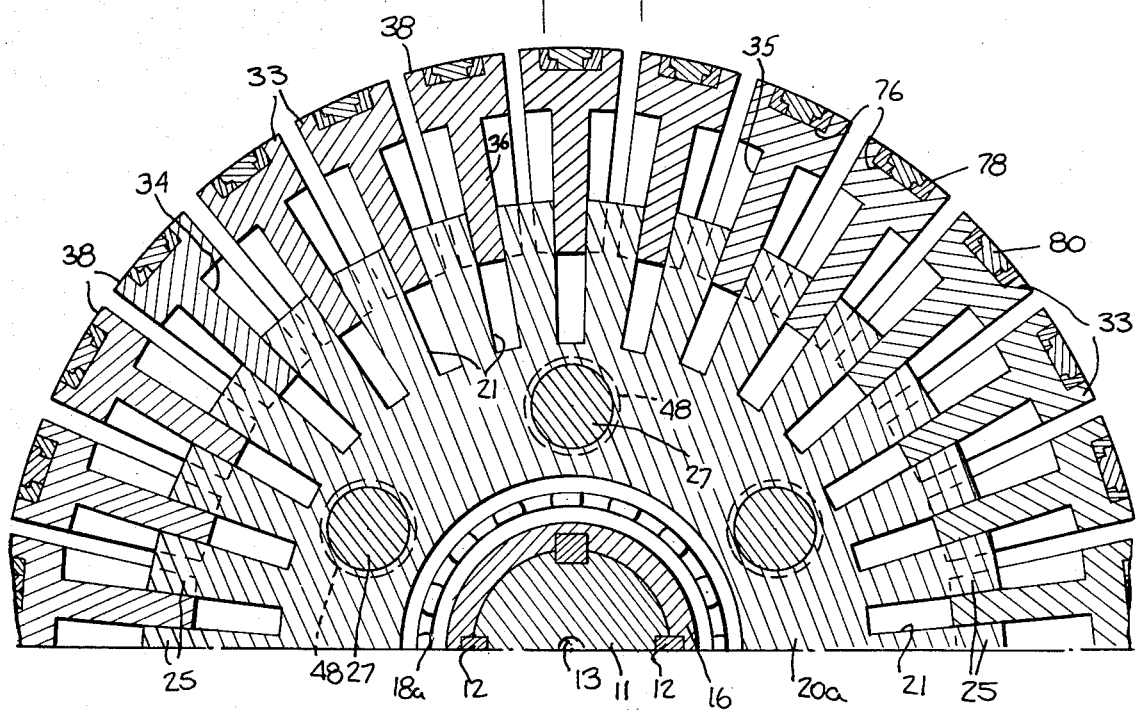
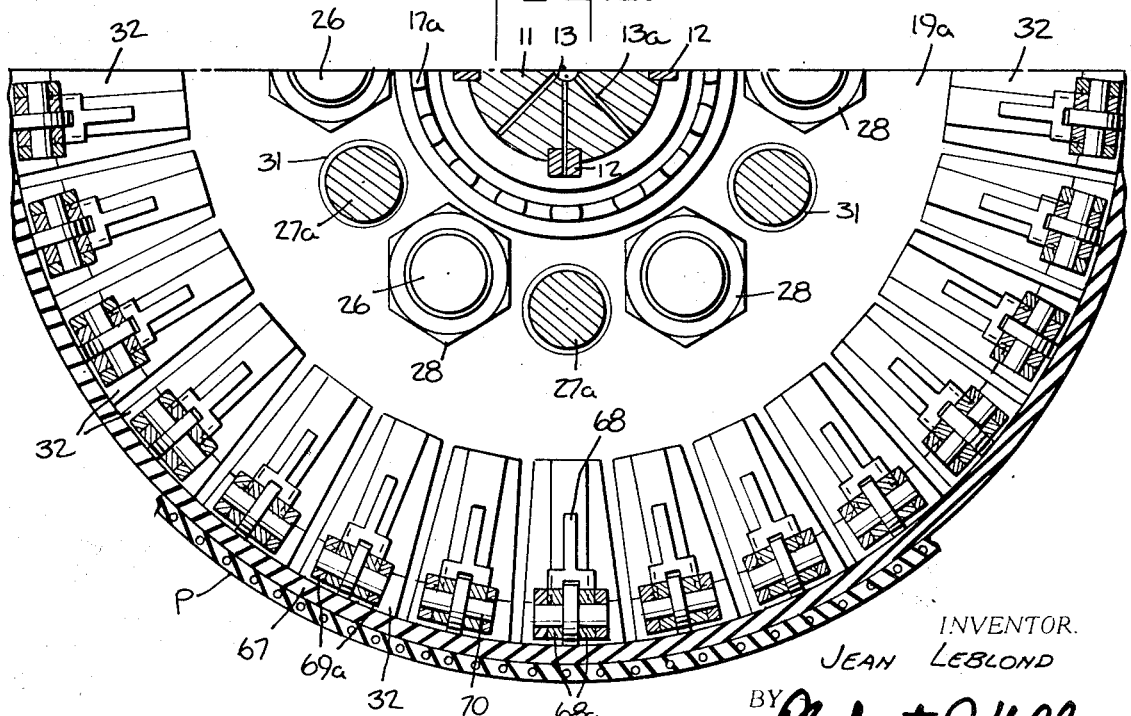

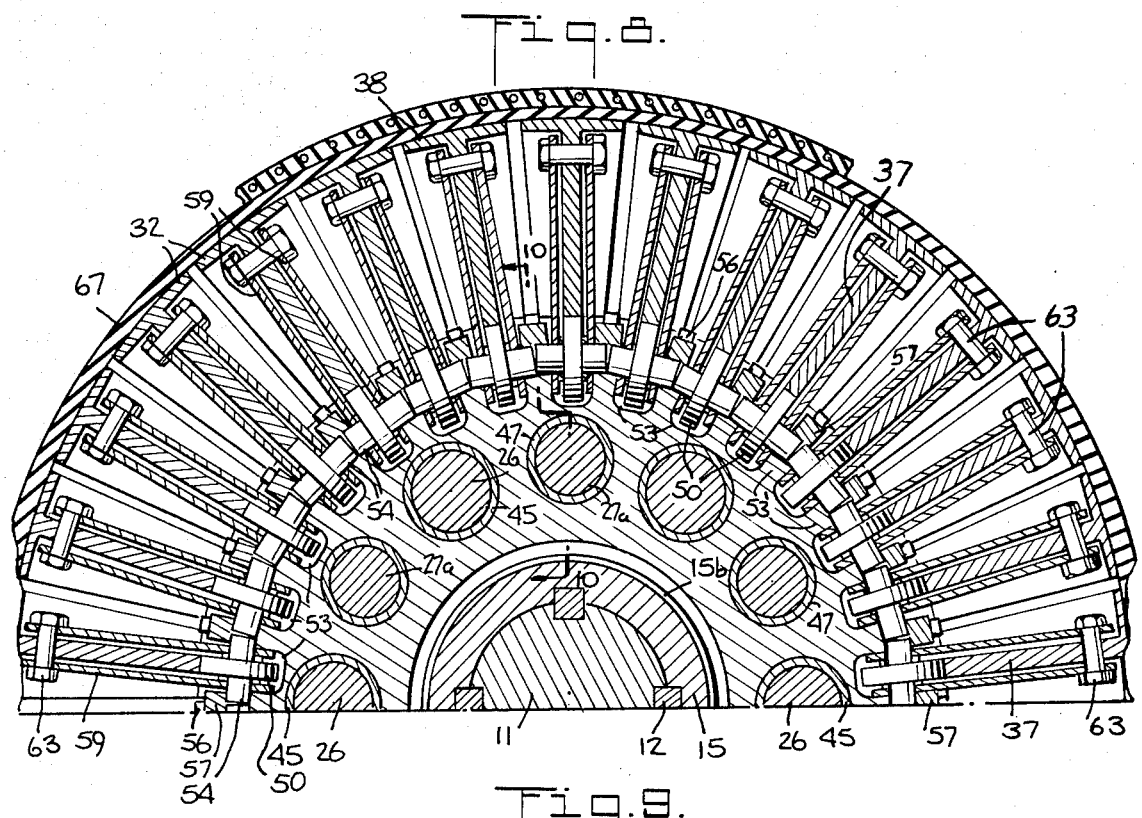
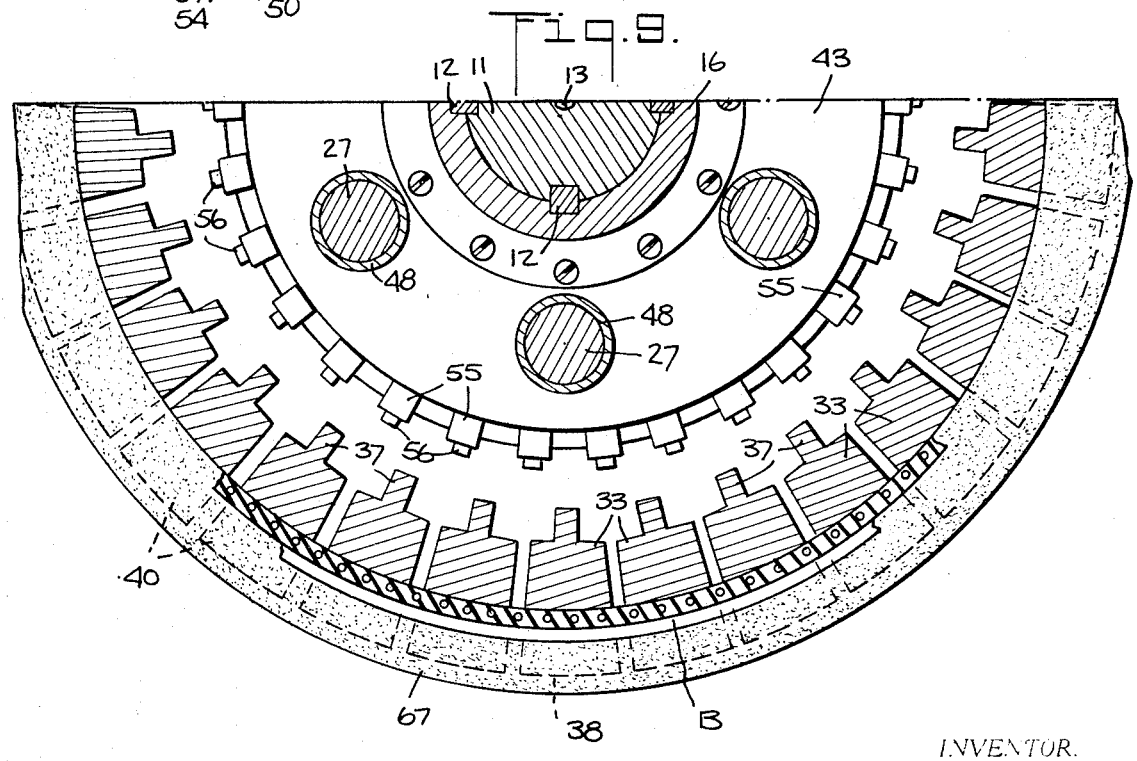

TIRE BUILDING DRUM

This invention relates to tire building drums, and in particular to a radially expansible and axially contractable drum for the single-stage building of radial ply tires.

It is known that in the building of a radial ply tire, first a cylindrical carcass having one or more plies of rubberized tire cord fabric interconnecting spaced bead cores is formed, then the bead cores are moved toward one another while the central portion of the carcass is expanded to a predetermined larger diameter to change the carcass shape from cylindrical to toroidal, and then a breaker consisting of one or more breaker cord plies is applied circumferentially to the crown region of the carcass. Finally, the rubber stocks to constitute the sidewalls and a tread are added to the appropriate regions of the expanded carcass. These steps are conventionally performed either in a single-stage building operation, employing an inflatable drum capable of having both its diameter and its axial length changed, or in a two-stage building operation in which the cylindrical carcass is initially formed on a first, generally rigid drum and is then transferred to a second, inflatable drum to be expanded into toroidal form.

In certain drums employed in the conventional single-stage building operation, the bead cores are initially fitted over the portions of the carcass ply material overlying the respective cylindrical, usually metallic, end members of the drum which are interconnected by an inflatable, cylindrical rubber diaphragm. Respective externally circumferentially grooved segmental components of these end members underlying the bead cores are then displaced radially outwardly by internal fluid pressure-inflatable bags until the bead cores and the underlying regions of the ply material are received and gripped in the said grooves. This, of course, precedes the ply turn-up and carcass-shaping operations.

It has been found, however, that the described bead gripping system is not always acceptable for all tire building operations, especially where the carcass ply material is relatively stiff by virtue of having steel wires or cables incorporated therein as the reinforcing elements. In such a case, not only is the ply turn-up operation difficult to initiate due to the high stiffness of the ply material, but the occurrence of some slippage or rotational movement of the carcass ply material and of the rubber elements of the bead regions relative to the bead cores during both the ply turn-up operation and the carcass-shaping operation cannot be avoided. This tends to produce irregularities of the structure of the tires in the bead regions thereof which in turn tend to lead to premature failure of such tires by bead separations.

It is the basic object of the present invention, therefore, to provide means in a single-stage building drum for steel carcass tires will enable the aforesaid drawbacks and disadvantages to be efficaciously overcome.

The foregoing and other objects of the present invention, as well as the characteristics thereof and advantages accruing therefrom, will be more clearly understood from the following detailed description thereof when read in conjunction with the accompanying drawings, in which:

FIG. 2 is a view similar to FIG. 1 and shows the drum still in its cylindrical state but radially expanded somewhat in the bead core gripping stage of the building operation;

FIG. 3 is an enlarged, fragmentary, partly sectional view of a portion of the bead core gripping structure of the drum in the same operational stage as that shown in FIG. 2;

FIG. 4 is a view similar to FIG. 3 and shows the same structure in the ply turn-up stage of the building operation;

FIG. 5 is a view similar to FIG. 2 and shows the drum in its and axially contracted state in the shaping stage of the building operation;

Figure 11:
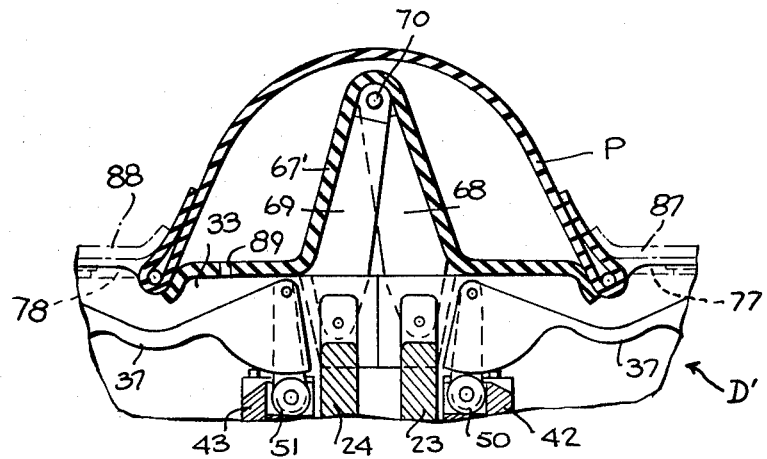

FIGS. 6, 7, 8 and 9 are somewhat enlarged sectional views taken, respectively, along the lines 6—6, 7—7, 8—8 and 9—9 in FIG. 2;

FIG. 10 is a somewhat enlarged sectional view taken along the line 10—10 in FIG. 8 and FIG. 11 is a fragmentary view, similar to FIG. 5, of a somewhat modified drum in the shaping stage of the building operation.

Referring now to the drawings in greater detail, the radially expansible and axially contractable tire building drum D according to the present invention includes two end sections D-1 and D-2 and a middle section D-3 to be more fully described presently. The drum further includes a main support and drive shaft 11 journalled in any suitable manner (not shown) for rotation about a horizontal axis. The shaft 11 is provided with a plurality of longitudinal external splines 12 and with an internal axial bore 13 having radial branches 13a opening into the interior of the drum generally medially thereof to enable pressurized air to be admitted into the drum for shaping purposes, as will be more fully explained hereinafter. The air is admitted into the shaft via a suitable coupling 14 from any available source (not shown) in the plant.

The drum end sections D-1 and D-2 comprise first and second sleeves 15 and 16 which are concentric with and axially splined to the shaft for longitudinal reciprocal movement therealong. Each of the sleeves 15 and 16 is externally threaded in opposite senses over the two halves thereof extending from its middle to its ends, as shown at 15a–15b and 16a–16b. Rotatably mounted on the sleeves at the opposite ends thereof by means of respective pairs of bearings 17–17a and 18–18a are first and second pairs of radial annular cross-heads 19–19a and 20–20a. The cross-heads are provided with respective sets of circumferentially spaced, outwardly open, parallel-sided radial slots, shown in FIG. 6 at 21 for the cross-head 20a, all of the slots in each of the cross-heads being in alignment with the corresponding slots in the other cross-heads. The radial tongues 22, 23, 24 and 25 bounding the slots in the various cross-heads thus increase somewhat in width in the radially outward direction.

Figure 1A:
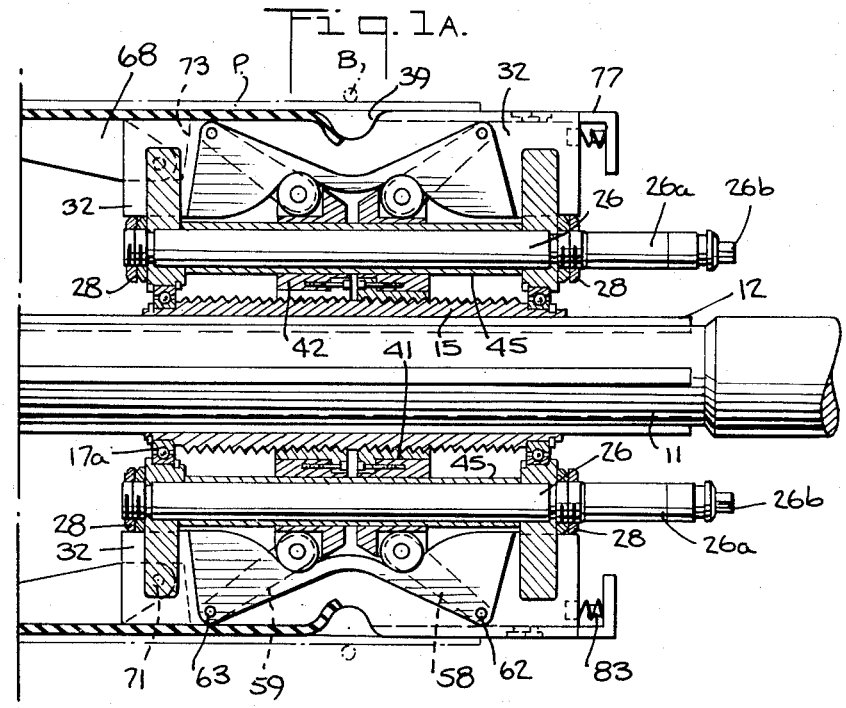
FIG. 1A is a similar view of the right-hand end section of the drum shown in FIG. 1, the view being taken on a different plane to show additional details.

The respective paired cross-heads 19–19a and 20–20a are rigidly interconnected by means of first and second sets of circumferentially spaced parallel tie rods 26 (FIG. 1A) and 27 locked in place by means of nuts 28 and 29. The cross-heads 19 and 19a are also provided with respective mutually aligned sets of openings equipped with slide bearings 30 and 31, these openings being spaced circumferentially of the said cross-heads in an alternating sequence with the associated tie rods 26. The tie rods 27 of the second set are circumferentially offset or staggered relative to the tie rods 26 of the first set and have longitudinal extensions 27a each passing slidably through the respective aligned ones of the said openings in the pair of cross-heads 19–19a to beyond the cross-head 19. The tie rods 26 for the cross-heads 19 and 19a also have longitudinal extensions 26a protruding beyond the cross-head 19. The two sets of longitudinal extensions are constructed and arranged, as indicated only schematically at 26b (FIG. 1A) and 27b, for connection to suitable push-pull drive means (not shown) operatable to reciprocate two sets of tie rods along with the associated cross-heads and sleeves jointly but in opposite senses axially along the shaft 11 selectively toward and away from each other.

The drum end sections further comprise first and second radially split cylindrical drum members arranged concentrically about the sleeves 15 and 16, respectively, the drum members being constituted by respective sets of circumferentially side-by-side cylindrical sector-shaped elements 32 and 33 bridging the spaces between the associated pairs of cross-heads 19–19a and 20–20a. Adjacent its opposite ends, both of which, except as hereinafter indicated, are substantially identical in construction, each element 32 and 33 is bilaterally recessed, as shown most clearly at 34 and 35 in FIGS. 1B, 2, 5 and 6. These recesses slidably accommodate the tongues 22 to 25, while the reduced thickness webs 36 between the respective pairs of recesses are slidably accommodated in the radial slots 21 of the respective cross-heads. Between its recessed end portions, each of the elements 32 and 33 is further bilaterally recessed to provide a radially inwardly facing, axially extending ridge 37 contoured to provide twin cam tracks 37a–37b substantially coextensive in length, respectively, with the oppositely threaded halves of the associated one of the sleeves 15 and 16 and sloping appropriately toward each other from a maximum radial height (as seen relative to the radially outwardmost surface 38 of that element) at 37c at the opposite ends of the ridge to a minimum radial height 37d in the medial region thereof. The various drum member elements further have respective identically located, substantially medial, transverse grooves 39 and 40 in their radially outermost surfaces 38 to define a pair of continuous, circumferential grooves on the drum members when the same are in their minimum diameter state by virtue of the respective assemblies of associated sector-shaped elements being in the radially inwardmost positions thereof relative to the cross-heads 19–19a and 20–20a.

Figure 1D:
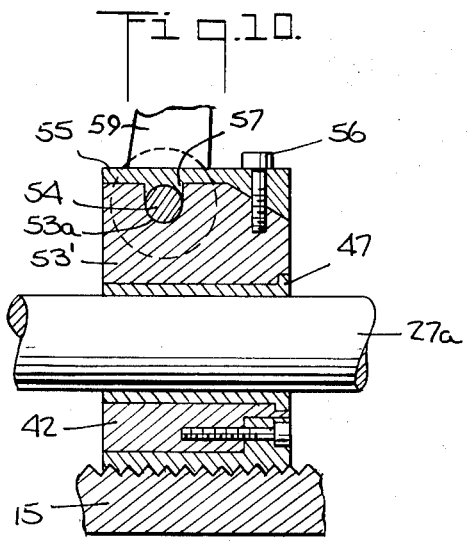
FIG. 1 is a fragmentary, partly elevational, axial section through a tire building drum according to one aspect of the present invention and shows the same in its cylindrical minimum diameter state at the start of a tire carcass building operation.
FIGS. 1B and 1C are fragmentary perspective views of details of the drum structure.

Disposed within the confines of the drum members 32 and 33 are first and second pairs of internally threaded ring members 41–42 and 43–44 which are threaded onto the first and second sleeves 15 and 16, respectively, the ring members 41 and 42 riding on the respective oppositely threaded halves 15a and 15b of the sleeve 15, and the ring members 43 and 44 riding on the respective oppositely threaded halves 16a and 16b of the sleeve 16. The first ring members 41 and 42 are provided with respective mutually aligned, circumferentially spaced openings accommodating in an alternating sequence the elongated slide bearings 45 fixed to the tie rods 26 and the short slide bearings 46 and 47 fixed to the ring members and through which extend the longitudinal extensions 27a of the tie rods 27. The second ring members 43 and 44 are provided with respective mutually aligned, circumferentially spaced openings slidably accommodating the elongated slide bearings 48 fixed to the tie rods 27. It will be understood, therefore, that upon the occurrence of relative rotation between the shaft 11 and the cross-heads 19–19a and 20–20a, for example when the latter are held stationary while the shaft is rotated, the pairs of ring members 41–42 and 43–44 will be displaced along the respective sleeves 15 and 16 either away from each other or toward each other, i.e., from the positions shown in FIG. 1 to the positions shown in FIG. 2 or vice versa, depending on the direction of rotation of the shaft 11.

In order to enable the described axial movements of the ring members 41 to 44 to be translated into radial outward and inward movements of the drum member elements 32 and 33, the ring members are linked to the said elements in a manner still to be described, and respective sets of cam rollers 49, 50, 51 and 52 are journalled in circumferentially spaced relation at the outer peripheries of the said ring members for rotation about respective axes oriented in planes normal to the axis of the shaft 11, each of said rollers being in rolling surface contact with the associated cam track portion 37a or 37b of the ridge 37 of the respective overlying sector-shaped element 32 or 33. As best shown in FIGS. 1C and 8, each ring member is provided in its outer periphery with circumferentially spaced recesses 53 separated by partitions 53'. The various partitions are provided with outwardly open recesses 53a defining the bearing locations for the axles 54 of the rollers 49 to 52. The axles 54 are retained in the recesses 53 by means of suitable rigid saddles 55 extending over the said recesses and secured to the ring members by bolts 56 (FIGS. 8, 9 and 10), each saddle having an inwardly extending, concavely faced projection 57 adapted to engage and complete the bearing for the underlying adjacent pair of axles 54.

As stated above, the ring members are linked to the drum member elements 32 and 33. To this end, there are provided for the various ring members respective sets of twin-armed linkages 58, 59, 60 and 61 the paired arms of which are disposed perpendicularly to the axles 54 and on opposite sides of the respective cam rollers 49 to 52 and the associated ridges 37 (FIGS. 1C and 8). The pairs of link arms are rotatably connected at one end to respective ones of the axles 54, and are pivotally connected at the other end to the corresponding end portions of the overlying elements 32 and 33 by means of suitable pivot pins or bolts 62, 63, 64 and 65 extending through appropriate apertures 66 (FIG. 1B)

provided in the ridges 37. It will be apparent, therefore, that as each pair of ring members is moved apart, the respective sets of cam rollers riding along the cam tracks 37a and 37b of the associated set of sector-shaped elements latter to be displaced radially outwardly of the drum, i.e., from the FIG. 1 position to the FIG. 2 position. Conversely, as each pair of ring members is moved closer together, the respective sets of linkages ensure that the sector-shaped elements will be drawn radially inwardly of the drum, i.e., from the FIG. 2 position to the FIG. 1 position.

The middle section D-3 of the drum D includes an elastically radially expansible tubular diaphragm 67 surrounding the space between the drum end sections D-1 and D-2. The end regions of the diaphragm extend over the adjacent portions of the drum members 32 and 33, the diaphragm being circumferentially secured at its opposite ends 67a and 67b to the sector-shaped elements in the vicinity of the adjacent sides of the circumferential grooves 39 and 40. In the axially most expanded state of the drum (FIGS. 1 and 2), the diaphragm 67 defines a portion of the cylindrical carcass building surface of the drum. To ensure that the building surface is continuously cylindrical and of the same diameter over its entire length, therefore, the radial dimensions of the sector-shaped elements to the adjacent sides of the grooves 39 and 40 are less than those to the remote sides of the grooves by the thickness of the diaphragm (see also FIG. 5).

The middle section of the drum further includes a plurality of circumferentially spaced, longitudinally aligned pairs of lever arms 68 and 69 of identical length arranged in the space within the confines of the diaphragm 67. The lever arms of each pair are disposed in a respective common axial plane and are articulated at their adjacent bifurcated ends 68a and 69a (FIGS. 1B and 7) to one another in the transverse plane of symmetry of the drum by means of pivot pins 70 (FIGS. 1, 2 and 5), and at their remote ends to the respective opposed ones of the sector-shaped elements of the first and second drum members by means of pivot pins 71 and 72. The elements 32 and 33 for this purpose are provided at their adjacent ends with respective radial slots 73 and 74 accommodating the lever arms 68 and 69, the radially inwardmost bottoms of these slots constituting stops or abutments to define the straight positions of the lever arms and prevent any over-center displacement thereof inwardly of the drum. The lever arms are, however, constructed and arranged to ensure that, upon relative approaching movement of the drum end sections, the common junctures 70 of the lever arms will be displaced radially outwardly of the drum in the plane of symmetry. The lever arms are further constructed and arranged to have their radially outwardmost surfaces lying along a cylindrical locus when the drum end members are in their axially most separated state, the diameter of the said locus being such that the lever arms provide a rigid support for the diaphragm 67 in the axially expanded state of the drum and aid in maintaining the cylindrical outer surface of the diaphragm in the proper position relative to the remainder of the drum for carcass building purposes.

The drum member elements 32 and 33 are further provided in the end regions of their outer surfaces 38 to the remote sides of the grooves 39 and 40 with elongated recesses 75 and 76 extending axially inwardly from the ends of the elements and terminating at the said grooves. Slidably received in the respective recesses 75 and 76 and pusher bars 77 and 78, these being retained in the said recesses by means of headed guide plugs 79 and 80 secured to the elements 32 and 33 in the confines of countersunk slots 81 and 82 provided in the pusher bars. The latter are normally biased axially outwardly of the respective elements 32 and 33 by means of springs 83 and 84 bearing at one end against respective radially inwardly bent portions or like adjuncts 77a and 78a of the pusher bars 77 and 78 and seated at the other end in suitable recesses 85 and 86 provided in the remote end faces of the drum member elements.

In use, at the start of a carcass building operation, the drum D is in an axially expanded and radially contracted state (FIG. 1), with the spacing of the drum end sections D-1 and D-2 depending on the sizes of tires to be built. At this time, the cross-heads 22 to 25 are held against both axial movement and rotation relative to the shaft 11 in any suitable manner (not shown), and the various sector-shaped elements 32 and 33 are in their radially most retracted positions relative to the cross-heads due to the pairs of ring members 41-42 and 43-44 being in their most approached states adjacent the middles of the respective sleeves 15 and 16 to position the cam rollers 49 to 52 at the minimum height portions 37d of the cam tracks 37a and 37b. The diaphragm 67 is held taut and is internally rigidly supported by the pairs of then longitudinally aligned lever arms 68 and 69, the entire drum having a uniform minimum diameter somewhat less than the inner diameter of the bead cores B to be incorporated in the carcass.

The radial carcass ply material P (shown, by way of example, as a mono-ply structure of rubberized steel wires or cables) is now laid onto the drum, symmetrically relative thereto and with its marginal regions P' overlying the grooves 39 and 40, the drum being rotated as needed by rotating the shaft 11 and the cross-heads together therewith. Because the diaphragm is internally rigidly supported by the lever arms, of course, it cannot sag, enabling the ply material to be built up flat and without deformations. The bead cores are then slipped freely onto the drum end members and the marginal regions of the carcass ply material supported by the drum.

When the bead cores are in position in surrounding relation to the grooves 39 and 40, the cross-heads 22 to 25 are retained fixed in position, but the restraint against relative rotation between them and the shaft 11 is removed. The shaft is now rotated in the appropriate direction while the cross-heads remain stationary, to cause the pairs of ring members 41-42 and 43-44 to move apart over the respective sleeves 15 and 16 from the positions illustrated in FIG. 1 to the positions illustrated in FIG. 2. As this takes place, the cam rollers 49 to 52 ride along their respective cam tracks 37a and 37b from the minimum radial height portions 37d to the maximum radial height portions 37c, displacing the various sector-shaped elements 32 and 33 radially outwardly relative to the cross-heads, together with the still longitudinally aligned pairs of lever arms 68 and 69. The latter thus maintain their function of internally rigidly supporting the diaphragm 67 as the same is stretched radially during the drum-expanding operation.

As the drum is expanded in this manner, the bead cores B are caused to enter the grooves 39 and 40, drawing the underlying portions of the carcass ply material along, and the expansion is continued until the ply material is firmly clamped between the bead cores and the expanded drum members 32 and 33 (FIGS. 2 and 3). It will be understood that by the use of the screw thread-actuated mechanical outward camming of the drum member elements, it is possible to exert an extremely high and unyielding force on the highly stiff ply materials so as to cause the same to be clamped hard against the bead cores.

The pusher bars 77 and 78 are then actuated by any suitable external mechanism (not shown) and displaced axially inwardly relative to their respective drum member elements (FIG. 4), to bend the marginal regions P' of the carcass ply material lifted off the surfaces of the drum end members partly over the bead cores B into positions, indicated in solid lines in FIG. 4, where they can be engaged by suitable stitching devices (not shown) and pressed against and adhered to the main portion of the carcass ply material P. As a part of this operation, of course, the various other structural elements (not necessary to itemize herein) which go into the fabrication of the basic cylindrical carcass of a radial ply tire will also have been applied to and incorporated in the carcass.

The cylindrical carcass is then subjected to a shaping operation in the course of which it is transformed into a toroidal form to facilitate the application thereto of breaker and tread elements (not shown). To this end, the push-pull drive means connected to the tie rod extensions 26a and 27a is activated to displace the pairs of cross-heads 19–19a and 20–20a toward one another and thus toward the transverse plane of symmetry of the drum axially along the shaft 11 at identical speeds. The attainment of this condition is, as will be understood, greatly facilitated by the provision of the pairs of lever arms 68–69 the joint axes of articulation 70 of which at this time are being displaced radially outwardly of the drum in the said plane of symmetry as the lever arms of each pair move into angularly oriented positions relative to each other (FIG. 5). During the initial phase of this movement, furthermore, the lever arms also assist in starting the radial expansion of the surrounding diaphragm and carcass ply material. Simultaneously, the carcass is inflated with pressurized air admitted into the shaft 11 via the coupling 14 and thence into the interior of the drum interior via the bores 13 and 13a. For this purpose, of course, suitable cup-shaped end bells (shown only in phantom outline at 87 and 88 in FIG. 5), adapted to be telescoped over the drum end sections D-1 and D-2 and to seal peripherally against the bead areas of the carcass as well as around the various tie rod extensions and the shaft to prevent escape of the air introduced into the drum, should be provided, to enable air to inflate the carcass on the drum during the movement of the drum end sections D-1 and D-2 toward each other.

The use of the non-yielding mechanical camming means according to the present invention for clamping the carcass ply material, which is relatively stiff and requires the exertion of relatively great force to bend it out of its plane state, against the bead cores also insures that the ply material will not be held with insufficient force or in such a manner that the force could be overcome. This, if permitted, might enable the carcass ply material to slip relative to the bead cores during the turn-up and shaping operations which could result in an improper positioning of the tire parts in the bead region, possibly necessitating the scrapping of the finished tire before sale, and possibly leading to premature failure of the tire in service due to bead separations.

After the various tire components to be applied to the carcass while the drum is in its radially expanded and axially contracted condition have been affixed thereto, the inflation pressure is released and the end bells are moved away from the beads, and the drum end sections are then axially separated and radially collapsed to bring the drum back to its first condition, the movements being the reverse of those hereinbefore described. The completed carcass can then be removed from the drum, preparatory to the next building operation.

The shaping of the carcass as so far described utilizes, as can best be seen from FIG. 5, an indirect application of air pressure to the carcass from the interior of the drum through the intermediary of an imperforate and air-tight diaphragm 67. It is within the contemplation of the present invention, however, that the carcass P may also be shaped with the aid of a direct application of internal air pressure to the carcass without concurrent inflation of the diaphragm. To this end, the drum D' (FIG. 11) for the direct inflation type of shaping operation according to the present invention has a structure which differs slightly from the structure of the drum D. In the drum D' there is provided a diaphragm 67' having at least one air passage 89 therethrough (for obvious reasons the provision of several such passages would normally be preferred). Such passages would serve to admit the air pressure from the feed-in duct system (the latter is not shown in FIG. 11 but would be analogous to, even though it could differ in details from, the bore arrangement 13–13a shown in FIG. 5) into the space between the diaphragm and the inner surface of the carcass P. It will be apparent that in this arrangement the diaphragm 67' would not be ballooned out during a shaping operation. Rather, it would remain in contact with the lever arms 68 and 69 at all times and would be distended out of its cylindrical state only in its middle region by virtue of the movement of the middle junctures 70 of the assembly of lever arms, so as to assume in that region a conical disc-like shape corresponding to that of the assembly of lever arms. Other than this, the shaping operation on the drum D' is identical with that on the drum D and need not be further described.

It will be understood that the foregoing description of one embodiment of the present invention is for purposes of illustration only, and that the various structural and operational features herein disclosed are susceptible to a number of modifications and changes none of which entails any departure from the spirit and scope of the present invention as defined in the hereto appended claims. Merely by way of example, a drum according to the present invention could be used in building multi-ply tire carcasses where the assembly of plies has the high stiffness mentioned, and the shaping could be done after the application of breaker plies to the carcass, and the diaphragm could be provided with air passages therethrough to enable the carcass to be inflated directly without concurrent inflation of the diaphragm (in such a case, the diaphragm would be distended out of its cylindrical state only by the middle junctures of the lever arms 68 and 69 and would assume a shape somewhat similar to that of the assembly of lever arms). Also, the numbers of the tie rods and sector-shaped drum elements could differ from those illustrated in the drawings.

Having thus described the invention, what is claimed and desired to be protected by Letters Patent is:

1. A radially expansible and axially contractable tire building drum, for use in connection with the building of tire carcasses of high stiffness ply material having metallic wire reinforcing cords or cables incorporated therein, comprising:

a. a rotatable shaft;
   b. a pair of cylindrical drum end sections arranged concentrically about said shaft and supported thereby for joint opposed axial reciprocal movement therealong, for joint rotational movement therewith, and for relative rotational movement between said drum end sections and said shaft, each of said drum end sections comprising a respective set of axially extending, circumferentially side-by-side, radially displaceable, cylindrical sector-shaped elements, and said drum end sections defining the bead locations for the carcasses to be built and having, when in their axially most separated locations and with their respective sets of said elements in their radially inwardmost positions, a minimum outer diameter sufficiently small to permit a pair of respective bead cores to be slipped axially onto said drum end sections and into surrounding relation to the end regions of the carcass ply material supported thereby; and
   c. mechanical camming means operative interconnected between said shaft and said elements of said drum end sections for selectively displacing said elements under a high unyielding force radially outwardly from the minimum outer diameter state of said drum end sections and retracting said elements radially inwardly back to said minimum diameter state, said camming means comprising axially extending, radially inwardly facing identical cam track means of gradually varying radial height on each of said elements, respective cam roller means bearing against said cam track means, means rotatably supporting said cam roller means, and screw thread actuating means connected with both said shaft and said supporting means for displacing the latter axially along said shaft and said elements upon relative rotational movement between said shaft and said supporting means so as to cause said cam roller means to ride over said cam track means, whereby upon a resultant movement of said cam roller means from the respective minimum height portions of said cam track means to the respective maximum height portions thereof said elements are displaced radially outwardly so as to cause the overlying end regions of the carcass ply material to be clamped hard against the respective surrounding bead cores.

2. A tire building drum as claimed in claim 1; said actuating means comprising a pair of externally threaded sleeves mounted on said shaft non-rotatably relative thereto, said supporting means comprising at least one internally threaded ring member threaded onto each of said sleeves and provided with means for inhibiting rotation of said ring members with said shaft, and said cam roller means comprising respective sets of cam rollers journalled on the outer peripheries of said ring members and corresponding in number and circumferential location to said elements and said cam track means thereof.

3. A tire building drum as claimed in claim 1; said actuating means comprising a pair of sleeves mounted on said shaft non-rotatably relative thereto, each of said sleeves being externally threaded in opposite senses over its two halves extending from the middle thereof to its opposite ends, said cam track means comprising a ridge on each of said elements defining two identical cam track portions in mirror image relation to each other and each substantially coextensive with a respective one of said oppositely threaded halves of the corresponding one of said sleeves, said supporting means comprising two pairs of internally threaded ring members, the two ring members of each pair being threaded each onto a respective one of said halves of the corresponding sleeve and being provided with means for inhibiting rotation of said ring members with said shaft, and said cam roller means comprising a plurality of sets of cam rollers journalled on the respective outer peripheries of said ring members and in circumferentially spaced relation thereabout, each set of cam rollers corresponding in number and circumferential location to said elements and the respective cam track portions thereof.

4. A tire building drum as claimed in claim 3; further comprising a respective set of circumferentially spaced linkages interconnecting each of said ring members with the individual elements of the associated one of said drum end sections.

5. A tire building drum as claimed in claim 1; said elements having identically located, substantially medial, transverse grooves in their radially outermost surfaces to define a continuous, circumferential, bead core-receiving groove on each of said drum end sections when the same are in said minimum diameter states thereof.

6. A tire building drum as claimed in claim 5; each of said elements being provided in its radially outermost surface with an axially oriented recess extending from one end of that element to said transverse groove thereof, a ply turn-up pusher bar slidably received in and extending the entire length of each of said recesses for movement into and out of overlying crossing relation to the associated transverse groove, and means yieldingly retaining each pusher bar out of such overlying crossing relation to the associated transverse groove.

7. A tire building drum as claimed in claim 1; further comprising an elastically radially expansible tubular diaphragm surrounding the space between said drum end sections and overlying the adjacent portions of the latter, said diaphragm being circumferentially secured at its opposite ends to said elements substantially medially thereof and defining, in the axially most separated state of said drum end sections, a portion of the cylindrical carcass building surface of the drum, and folding lever arm means arranged in said space within the confines of said diaphragm and having the folding junctures thereof disposed in the transverse plane of symmetry of the drum, said lever arm means being articulated to the respective opposed ones of said sector-shaped elements of said drum end sections, and said lever arm means being constructed and arranged, to have their radially outwardmost surfaces lying along a cylindrical locus in the axially most separated state of said drum end sections to provide a rigid support for said diaphragm in a position imparting a continuous cylindrical outer surface to the entire drum for carcass building purposes, and to have their folding junctures displaced in said plane of symmetry radially outwardly of said space upon relative approach of said drum end sections to each other for carcass shaping purposes.

8. A tire building drum as claimed in claim 7; said elements having respective identically located, substantially medial, transverse grooves in their radially outermost surfaces to define a continuous circumferential groove on each of said drum end sections when the same are in said minimum diameter states thereof, said diaphragm being secured to said elements substantially at the adjacent sides of said transverse grooves.

9. A tire building drum as claimed in claim 8; each of said elements being provided in its radially outermost surface with an axially oriented recess extending from the axially outermost end of that element to the respective transverse groove thereof, a respective ply turn-up pusher bar slidably received in each of said recesses for movement into and out of overlying crossing relation to said respective transverse groove, and means yieldingly retaining each pusher bar out of such overlying crossing relation to said respective transverse groove.

10. A tire building drum as claimed in claim 7; further comprising means for applying an elevated air pressure against the interior of a tire carcass to facilitate radial expansion thereof during a shaping operation, said pressure applying means comprising duct means communicating with the interior of said drum to enable application of said air pressure indirectly to the carcass via said diaphragm.

11. A tire building drum as claimed in claim 7; further comprising means for applying an elevated air pressure against the interior of a tire carcass to facilitate radial expansion thereof during a shaping operation, said pressure applying means comprising means defining at least one air passage through said diaphragm and duct means communicating with said air passage to enable application of said air pressure directly to the carcass and without inflation of said diaphragm.

12. A radially expansible and axially contractable tire building drum, for use in connection with the building of tire carcasses of high stiffness ply material having metallic wire reinforcing cords or cables incorporated therein, comprising:
a. a rotatable shaft;
b. first and second sleeves concentric with and axially splined to said shaft for longitudinal reciprocal movement therealong, each of said sleeves being externally threaded in opposite senses over the two halves thereof extending from its middle to its ends;
c. first and second pairs of radial annular cross-heads each one of which is rotatably mounted on a respective one of said sleeves at a respective one of the opposite ends of the same and coaxially therewith, each of said cross-heads being provided with a plurality of circumferentially spaced radial slots, all of said slots in each of said cross-heads being in alignment with the corresponding slots in the other cross-heads;
d. first and second sets of circumferentially spaced tie rods rigidly interconnecting the respective cross-heads of said first and second pairs, said cross-heads of said first pair being provided with respective mutually aligned sets of openings spaced circumferentially of said cross-heads in an alternating sequence with said tie rods of said first set, said tie rods of second set being circumferentially staggered relative to said tie rods of said first set and having longitudinal extensions each passing slidably through the respective aligned ones of said openings in said cross-heads of said first pair to beyond the one of the latter remote from said second pair of cross-heads, said tie rods of said first set having longitudinal extensions beyond said one cross-head of said first pair, the two sets of longitudinal extensions being constructed and arranged for connection to push-pull drive means operatable to reciprocate said sets of tie rods along with the associated cross-heads and sleeves jointly but in opposite senses axially along said shaft selectively toward and away from each other;
e. first and second radially split, cylindrical drum end sections arranged concentrically about said first and second sleeves, respectively, each of said drum end sections being constituted by a respective set of circumferentially side-by-side cylindrical sector-shaped elements bridging the gap between the associated pair of crossheads and having adjacent their opposite ends respective adjuncts slidably received in said radial slots of said associated cross-heads, each of said elements further having a radially inwardly facing, axially extending ridge contoured to provide twin cam tracks substantially coextensive, respectively, with the oppositely threaded halves of the associated sleeve and sloping toward each other from a maximum radial height at the opposite ends of that element to a minimum radial height in the medial region thereof, said elements further having respective identically located, substantially medial, transverse grooves in their radially outermost surfaces to define a continuous circumferential bead core-receiving groove on each of said drum end sections when the same is in its minimum diameter state by virtue of the respective set of said elements being in the radially inwardmost positions thereof relative to the associated pair of cross-heads, the minimum diameter of said drum end sections being sufficiently small to permit a pair of respective bead cores to be slipped axially onto said drum end sections and into surrounding relation to the end regions of the carcass ply material supported thereby;

f. first and second pairs of internally threaded ring members threaded onto said first and second sleeves, respectively, each of said ring members riding on a respective one of said oppositely threaded halves of the associated sleeve, said first pair of ring members being provided with respective mutually aligned, circumferentially spaced openings slidably accomodating said tie rods of said first set and said longitudinal extensions of said tie rods of said second set, said second pair of ring members being provided with respective mutually aligned, circumferentially spaced openings slidably accommodating said tie rods of said second set;

g. a respective plurality of cam rollers journalled in circumferentially spaced relation at the outer periphery of each of said ring members for rotation about respective axes disposed in a plane normal to the axis of said shaft, each of said rollers being in rolling surface contact with the associated cam track of the respective overlying sector-shaped element, whereby upon rotation of said shaft relative to said cross-heads in a predetermined sense, said ring members of each pair are moved along the respective sleeve away from each other to cause said drum end sections to expand radially under a high unyielding force as said rollers ride along said cam tracks from the minimum height portions to the maximum height portions thereof;

h. a respective plurality of circumferentially spaced pivotal linkages interconnecting each of said ring members with a respective portion of the associated overlying sector-shaped elements, whereby upon rotation of said shaft relative to said cross-heads in the opposite sense, said ring members of each pair are moved along the respective sleeve toward each other and said linkages cause said drum end sections to contract radially by drawing said elements radially inwardly as said rollers ride along said cam tracks from the maximum height portions to the minimum height portions thereof;

i. an elastically radially expansible tubular diaphragm surrounding the space between said drum end sections and overlying the adjacent portions of the latter, said diaphragm being circumferentially secured at its opposite ends to the respective sets of said sector-shaped elements in the vicinity of the adjacent sides of said transverse grooves and defining, in the axially most separated state of said drum end sections, a portion of the cylindrical carcass building surface of the drum;

j. a plurality of circumferentially spaced, longitudinally aligned pairs of lever arms of identical length arranged in said space within the confines of said diaphragm, said lever arms of each pair being disposed in a respective common axial plane of the drum and being articulated at their adjacent ends to one another in the transverse plane of symmetry of the drum and at their remote ends to the respective opposed ones of said sector-shaped elements of said first and second drum end sections, said lever arms being constructed and arranged, to have their radially outwardmost surfaces lying along a cylindrical locus in the axially most separated state of said drum end sections to provide a rigid support for said diaphragm in a position imparting a continuous cylindrical outer surface to the entire drum for carcass building purposes, and to have their common junctures displaced in said plane of symmetry radially outwardly of said space upon relative approach of said drum end sections to each other for carcass shaping purposes; and k. means for applying an elevated air pressure against the interior of a tire carcass to facilitate radial expansion thereof during a shaping operation.

13. A tire building drum as claimed in claim 12; each of said elements being provided in its radially outermost surface with an axially oriented recess extending from the axially outermost end of that element to the respective transverse groove thereof, a respective ply turn-up pusher bar slidably received in each of said recesses for movement into and out of overlying crossing relation to said respective transverse groove, and means yieldingly retaining each pusher bar out of such overlying crossing relation to said respective transverse groove.

14. A tire building drum as claimed in claim 12; said pressure applying means comprising duct means communicating with the interior of said drum to enable application of said air pressure indirectly to the carcass via said diaphragm.

15. A tire building drum as claimed in claim 12; said pressure applying means comprising means defining at least one air passage through said diaphragm, to enable application of said air pressure directly to the carcass and without inflation of said diaphragm.

* * * * *

UNITED STATES PATENT OFFICE
CERTIFICATE OF CORRECTION

Patent No. 3,718,520   Dated February 27, 1973

Inventor(s) Jean Leblond

It is certified that error appears in the above-identified patent and that said Letters Patent are hereby corrected as shown below:

Column 2, line 24, cancel the word "and".

Column 3, line 24, after "reciprocate" insert -- the --.

Column 5, line 5 after "elements" insert -- cause the --.

Column 6, line 4, "and" second occurrence should read -- are --.

Column 9, lines 4 to 11 cancel ",and the diaphragm could be provided with air passages therethrough to enable the carcass to be inflated directly without concurrent inflation of the diaphragm (in such a case, the diaphragm would be distended out of its cylindrical state only by the middle junctures of the lever arms 68 and 69 and would assume a shape somewhat similar to that of the assembly of lever arms)

Column 9, line 44 "operative" should read -- operatively --

Column 11, lines 56-57 cancel "and duct means communicating with said air passage"

Signed and sealed this 26th day of March 1974.

(SEAL)
Attest:

EDWARD M. FLETCHER, JR.
Attesting Officer

C. MARSHALL DANN
Commissioner of Patents